(12) United States Patent
Suzuki et al.

(10) Patent No.: US 10,840,492 B2
(45) Date of Patent: Nov. 17, 2020

(54) SEPARATOR AND SECONDARY BATTERY INCLUDING THE SEPARATOR

(71) Applicant: Sumitomo Chemical Company, Limited, Tokyo (JP)

(72) Inventors: Junji Suzuki, Niihama (JP); Toshihiko Ogata, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/344,232

(22) PCT Filed: Oct. 24, 2016

(86) PCT No.: PCT/JP2016/081497
§ 371 (c)(1),
(2) Date: Apr. 23, 2019

(87) PCT Pub. No.: WO2018/078707
PCT Pub. Date: May 3, 2018

(65) Prior Publication Data
US 2019/0245176 A1 Aug. 8, 2019

(51) Int. Cl.
*H01M 2/16* (2006.01)
*H01M 10/058* (2010.01)
(Continued)

(52) U.S. Cl.
CPC ............... *H01M 2/16* (2013.01); *B32B 5/24* (2013.01); *C08J 9/26* (2013.01); *H01G 11/52* (2013.01);
(Continued)

(58) Field of Classification Search
CPC ................ H01M 10/058; H01M 2/16
See application file for complete search history.

(56) References Cited

U.S. PATENT DOCUMENTS

| 5,385,777 A | 1/1995 | Higuchi et al. |
| 2001/0005560 A1 | 6/2001 | Yoshida et al. |

(Continued)

FOREIGN PATENT DOCUMENTS

| CN | 103038277 A | 4/2013 |
| CN | 104241574 A | 12/2014 |

(Continued)

OTHER PUBLICATIONS

Scientific and Technical Information Center (STIC) search results from B. Burnette (Year: 2019).*

(Continued)

*Primary Examiner* — Victoria H Lynch
(74) *Attorney, Agent, or Firm* — Panitch Schwarze Belisario & Nadel LLP

(57) ABSTRACT

Provided are a separator capable of being used for a secondary battery such as a nonaqueous electrolyte-solution secondary battery and a secondary battery including the separator. A separator having a first layer including a porous polyethylene and an organic additive is provided. A white index of the first layer is equal to or more than 85 and equal to or less than 98, and a reduction rate of diethyl carbonate dropped on the first layer is equal to or higher than 0.048 mg/s and equal to or lower than 0.067 mg/s. The separator may further include a porous layer over the first layer.

5 Claims, 1 Drawing Sheet

(51) Int. Cl.
  *B32B 5/24* (2006.01)
  *C08J 9/26* (2006.01)
  *H01M 10/0525* (2010.01)
  *H01G 11/52* (2013.01)

(52) U.S. Cl.
  CPC ....... *H01M 2/1653* (2013.01); *H01M 2/1686* (2013.01); *H01M 10/058* (2013.01); *H01M 10/0525* (2013.01); *H01M 2/166* (2013.01)

(56) References Cited

U.S. PATENT DOCUMENTS

| | | |
|---|---|---|
| 2006/0014080 A1 | 1/2006 | Kubo et al. |
| 2009/0030100 A1 | 1/2009 | Nagamatsu et al. |
| 2009/0186280 A1 | 7/2009 | Iidani et al. |
| 2011/0064929 A1 | 3/2011 | Rhee et al. |
| 2013/0164598 A1 | 6/2013 | Ishihara et al. |
| 2014/0178741 A1* | 6/2014 | Hasegawa ........... H01M 2/1686 429/144 |
| 2014/0377630 A1 | 12/2014 | Kawakami et al. |
| 2015/0236318 A1 | 8/2015 | Katayama et al. |
| 2017/0155110 A1 | 6/2017 | Yashiki |

FOREIGN PATENT DOCUMENTS

| | | | |
|---|---|---|---|
| JP | H05331306 A | 12/1993 | |
| JP | 2006004844 A | 1/2006 | |
| JP | 2007179846 A | 7/2007 | |
| JP | 2011521413 A | 7/2011 | |
| JP | 201373737 A | 4/2013 | |
| JP | 2013193375 A | 9/2013 | |
| JP | 2013213212 A | 10/2013 | |
| JP | 201447263 A | 3/2014 | |
| JP | 201456843 A | 3/2014 | |
| JP | 201560686 A | 3/2015 | |
| JP | 2015171814 A * | 10/2015 | .......... H01M 2/1686 |
| JP | 6014743 B1 | 10/2016 | |
| WO | 0079618 A1 | 12/2000 | |
| WO | 2007069560 A1 | 6/2007 | |

OTHER PUBLICATIONS

Written Opinion dated Dec. 13, 2016 in International Application No. PCT/JP2016/081497, translation only.
International Search Report dated Dec. 13, 2016 in International Application No. PCT/JP2016/081497.
Written Opinion dated Dec. 13, 2016 in International Application No. PCT/JP2016/081497.
Office Action dated Sep. 5, 2019 in KR Application No. 1020197013286 (Partial English Translation).
Office Action dated Nov. 13, 2019 in CN Application No. 201680090356.6 (Partial English Translation).

* cited by examiner

SEPARATOR AND SECONDARY BATTERY INCLUDING THE SEPARATOR

CROSS-REFERENCE TO RELATED APPLICATIONS

This application is a Section 371 of International Application No. PCT/JP2016/081497, filed Oct. 24, 2016, which was published in the Japanese language on May 3, 2018 under International Publication No. WO 2018/078707 A1, the disclosure of which is incorporated herein by reference in its entirety.

FIELD

An embodiment of the present invention relates to a separator and a secondary battery including the separator. For example, an embodiment of the present invention relates to a separator capable of being used in a nonaqueous electrolyte-solution secondary battery and a nonaqueous electrolyte-solution secondary battery including the separator.

BACKGROUND

As a typical example of a nonaqueous electrolyte-solution secondary battery, a lithium ion secondary battery is represented. Since a lithium-ion secondary battery has a high energy density, it has been widely used in electronic devices such as a personal computer, a mobile phone, and a mobile information terminal. A lithium ion secondary battery includes a positive electrode, a negative electrode, an electrolyte solution charged between the positive electrode and the negative electrode, and a separator. The separator separates the positive electrode and the negative electrode from each other and also functions as a film transmitting the electrolyte solution and carrier ions. For example, patent literature 1 to 9 disclose a separator including a polyolefin.

CITATION LIST

Patent Literature

Patent Literature 1: Japanese Patent Application Publication No. 2014-47263
Patent Literature 2: Japanese Patent Application Publication No. 2011-521413
Patent Literature 3: Japanese Patent Application Publication No. 2013-193375
Patent Literature 4: International Patent Application Publication No. 2007/069560
Patent Literature 5: Japanese Patent Application Publication No. H5-331306
Patent Literature 6: International Patent Application Publication No. 00/79618
Patent Literature 7: Japanese Patent Application Publications No. 2014-56843
Patent Literature 8: Japanese Patent Application Publications No. 2013-73737
Patent Literature 9: Japanese Patent Application Publications No. 2015-60686

SUMMARY

An object of the present invention is to provide a separator capable of being used in a secondary battery such as a nonaqueous electrolyte-solution secondary battery and a secondary battery including the separator.

An embodiment of the present invention is a separator including a first layer which consists of a porous polyolefin. A white index of the first layer is equal to or more than 85 and equal to or less than 98, and a reduction rate of diethyl carbonate dropped on the first layer is equal to or higher than 0.048 mg/s and equal to or lower than 0.067 mg/s.

Effects of Invention

According to the present invention, it is possible to provide a separator which can prevent reduction in battery performance of a secondary battery and a secondary battery including the separator.

DESCRIPTION OF EMBODIMENTS

Hereinafter, the embodiments of the present invention are explained with reference to the drawings and the like. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention.

In the specification and the claims, unless specifically stated, when a state is expressed where a structure is arranged "on" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "substantially including only A" or an expression "consisting of A" includes a state where no substance is included other than A, a state where A and an impurity are included, and a state misidentified as a state where a substance other than A is included due to a measurement error. When this expression means the state where A and an impurity are included, there is no limitation to the kind and concentration of the impurity.

First Embodiment

Figure 1A:
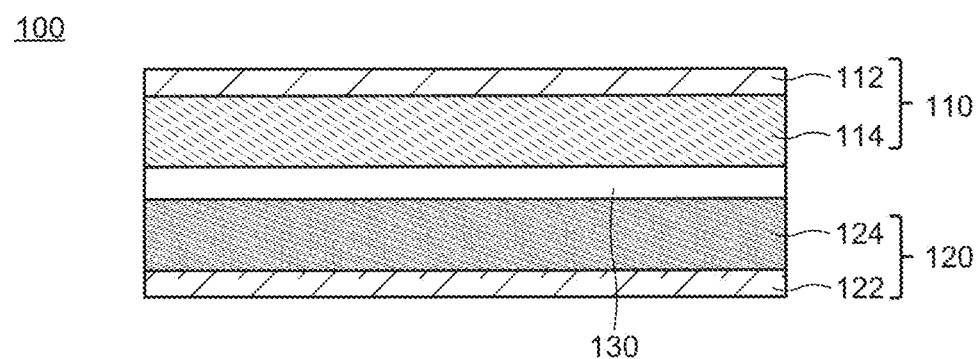
FIG. 1A and FIG. 1B are respectively schematic cross-sectional views of a secondary battery and a separator according to an embodiment of the present invention.

A schematic cross-sectional view of a secondary battery 100 according to an embodiment of the present invention is shown in FIG. 1A. The secondary battery 100 includes a positive electrode 110, a negative electrode 120, and a separator 130 separating the positive electrode 110 and the negative electrode 120 from each other. Although not illustrated, the secondary battery 100 possesses an electrolyte solution 140. The electrolyte solution 140 mainly exists in apertures of the positive electrode 110, the negative electrode 120, and the separator 130 as well as in the gaps between these members. The positive electrode 110 may include a positive-electrode current collector 112 and a positive-electrode active-substance layer 114. Similarly, the negative electrode 120 may include a negative-electrode current collector 122 and a negative-electrode active-substance layer 124. Although not illustrated in FIG. 1A, the secondary battery 100 further possesses a housing by which the positive electrode 110, the negative electrode 120, the separator 130, and the electrolyte solution 140 are supported.

1. Separator 1-1. Structure

Figure 1B:
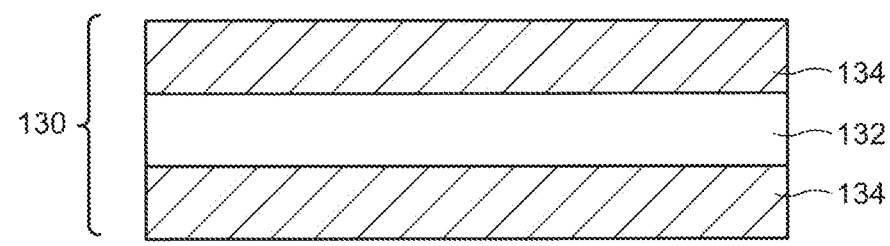

The separator 130 is disposed between the positive electrode 110 and the negative electrode 120 and serves as a film having a role of separating the positive electrode 110 and the negative electrode 120 and transporting the electrolyte solution 140 in the secondary battery 100. A schematic cross-sectional view of the separator 130 is shown in FIG. 1B. The separator 130 has a first layer 132 including a porous polyolefin and may further possess a porous layer 134 as an optional structure. The separator 130 may have a structure in which two porous layers 134 sandwich the first layer 132 as shown in FIG. 1B, or a structure in which the porous layer 134 is disposed only on one surface of the first layer 132. Alternatively, a structure may be employed where no porous layer 134 is provided. The first layer 132 may have a single-layer structure or may be structured with a plurality of layers.

The first layer 132 has internal pores linked to each other. This structure allows the electrolyte solution 140 to permeate the first layer 132 and enables carrier ions such as lithium ions to be transported via the electrolyte solution 140. At the same time, physical contact between the positive electrode 110 and the negative electrode 120 is inhibited. On the other hand, when the secondary battery 100 has a high temperature, the first layer 132 melts and the pores disappear, thereby stopping the transportation of the carrier ions. This behavior is called shutdown. This behavior prevents heat generation and ignition caused by a short-circuit between the positive electrode 110 and the negative electrode 120, by which high safety is secured.

The first layer 132 includes a porous polyolefin. Alternatively, the first layer 132 may be structured with a porous polyolefin. Namely, the first layer 132 may be configured so as to include only a porous polyolefin or substantially include only a porous polyolefin. The porous polyolefin may contain an additive. In this case, the first layer 132 may be structured only with the polyolefin and the additive or substantially only with the polyolefin and the additive. When the porous polyolefin contains the additive, the polyolefin may be included in the porous polyolefin at a composition equal to or higher than 95 wt %, equal to or higher than 97 wt %, or equal to or higher than 99%. Furthermore, the polyolefin may be included in the first layer 132 at a composition equal to or higher than 95 wt %, equal to or higher than 97 wt %, or equal to or higher than 99 wt %. A content of the polyolefin included in the porous film may be 100 wt % or equal to or less than 100 wt %. As the additive, an organic compound (organic additive) is represented, and the organic compound may be an antioxidant (organic antioxidant) or a lubricant.

As the polyolefin structuring the porous polyolefin, a homopolymer obtained by polymerizing an α-olefin such as ethylene, propylene, 1-butene, 4-methyl-1-pentene, and 1-hexene or a copolymer thereof is represented. A mixture of these homopolymers and copolymers or a mixture of the homopolymers or copolymers having different molecular weights may be included in the first layer 132. That is, the molecular-weight distribution of the polyolefin may have a plurality of peaks. The organic additive may have a function to prevent oxidation of the polyolefin, and phenols or phosphoric esters may be employed as the organic additive, for example.

Phenols having a bulky substituent such as a t-butyl group at an α-position and/or a β-position of a phenolic hydroxy group may be also used.

As a typical polyolefin, a polyethylene-based polymer is represented. When a polyethylene-based polymer is used, a low-density polyethylene or a high-density polyethylene may be used. Alternatively, a copolymer of ethylene with an α-olefin may be used. These polymers or copolymers may be a high-molecular weight polymer with a weight-average molecular weight equal to or higher than 100,000 or an ultrahigh-molecular weight polymer with a weight-average molecular weight of equal to or higher than 1,000,000. The use of a polyethylene-based polymer enables the shutdown function to be realized at a lower temperature, thereby providing high safety to the secondary battery 100. Moreover, mechanical strength of the separator can be increased by using an ultrahigh-molecular weight polymer with a weight-average molecular weight of equal to or higher than 1,000,000.

A thickness of the first layer 132 is appropriately determined in view of thicknesses of other members in the secondary battery 100 and may be equal to or larger than 4 µm and equal to or smaller than 40 µm, equal to or larger than 5 µm and equal to or smaller than 30 µm, or equal to or larger than 6 µm and equal to or smaller than 15 µm.

A weight per unit area of the first layer 132 is appropriately determined in view of its strength, thickness, weight, and handleability. For example, the weight per unit area may be equal to or more than 4 $g/m^2$ and equal to or less than 20 $g/m^2$, equal to or more than 4 $g/m^2$ and equal to or less than 12 $g/m^2$, or equal to or more than 5 $g/m^2$ and equal to or less than 10 $g/m^2$, by which a weight-energy density and a volume-energy density of the secondary battery 100 can be increased. Note that a weight per unit area is a weight per unit area.

With respect to gas permeability of the first layer 132, its Gurley value may be selected from a range equal to or higher than 30 s/100 mL and equal to or lower than 500 s/100 mL or equal to or higher than 50 s/100 mL and equal to or lower than 300 s/100 mL so that sufficient ion-permeability can be obtained.

A porosity of the first layer 132 may be selected from a range equal to or more than 20 vol % and equal to or less than 80 vol % or equal to or more than 30 vol % and equal to or less than 75 vol % so that a retention volume of the electrolyte solution 140 is increased and the shutdown function is surely realized. A diameter of the pore (average pore diameter) in the first layer 132 may be selected from a range equal to or larger than 0.01 µm and equal to or smaller than 0.3 µm or equal to or larger than 0.01 µm and equal to or smaller than 0.14 µm so that a sufficient ion-permeability and a high shutdown function can be obtained.

1-2. Property

The first layer 132 has a property to retain the electrolyte solution 140 as well as a property to transmit the electrolyte solution 140 therein. That is, the first layer 132 has a property to transmit a solvent and the carrier ion. Hence, the first layer 132 is configured to have affinity to the electrolyte solution 140 to an extent that enables the electrolyte solution 140 to be retained and allows the electrolyte solution 140 to permeate therethrough. Control of the affinity in an appropriate range provides a secondary battery exhibiting excellent performance.

The affinity to the electrolyte solution 140 is roughly classified into physical affinity and chemical affinity. The former is mainly influenced by the structures of a surface and the internal pores (shape, number, size, distribution, etc.) of the first layer 132, while the latter is mainly determined by chemical affinity of the material included in the first layer 132 with respect to the electrolyte solution 140. Thus, when the material is fixed, the affinity of the first layer 132 to the electrolyte solution 140 is mainly governed by the structure of the pores.

As described in the following Examples, the affinity of the first layer 132 to the electrolyte solution 140 can be estimated by a reduction rate of a droplet of the solvent in the electrolyte solution 140 formed by dropping the droplet on the first layer 132, a diameter of a spot formed by the droplet, and a white index (hereinafter, referred to as WI) of the first layer 132. It was found that, if at least a part of these properties falls within a specific range, a secondary battery having excellent performance can be provided.

In the present specification and the claims, the reduction rate of a droplet is a rate of reduction of the solvent in the electrolyte solution 140 dropped on the first layer 132 under the conditions of an atmospheric pressure, a room temperature (ca., 25° C.), humidity equal to or higher than 60% and equal to or lower than 70%, and a wind speed of 0.2 m/s or lower. Reduction of the solvent proceeds with evaporation. For example, when the solvent is diethyl carbonate, the reduction rate of a droplet is a rate of reduction caused by evaporation of diethyl carbonate dropped on the first layer 132. It was found that the secondary battery 100 having an excellent ability to maintain battery performance can be obtained by configuring the first layer 132 so that the reduction rate is controlled to be equal to or higher than 0.048 mg/s and equal to or lower than 0.067 mg/s, equal to or higher than 0.050 mg/s and equal to or lower than 0.063 mg/s, or equal to or higher than 0.053 mg/s and equal to or lower than 0.059 mg/s.

In the present specification and claims, the spot diameter is a diameter of a droplet on the first layer 132 which is observed 10 seconds after forming the droplet by dropping the droplet of the solvent in the electrolyte solution 140 on the first layer 132. For example, when the solvent is diethyl carbonate, the spot diameter is a diameter of a droplet of diethyl carbonate formed on the first layer 132. It was found that the secondary battery 100 having an excellent ability to maintain battery performance can be obtained by configuring the first layer 132 so that the spot diameter is controlled to be equal to or larger than 20 mm and equal to or smaller than 30 mm, equal to or larger than 21 mm and equal to or smaller than 30 mm, or equal to or larger than 22 mm and equal to or smaller than 30 mm.

In the present specification and the claims, the WI is the WI regulated by the American Standards Test Methods E313. It was found that the secondary battery 100 having an excellent ability to maintain battery performance can be obtained by controlling the WI to be equal to or more than 85 and equal to or less than 98 or equal to or more than 90 and equal to or less than 98.

The reduction rate of a droplet is the evaporation rate of the solvent in a state where the solvent exists at the surface or in the pores of the first layer 132. Thus, the reduction rate depends on the structures of the surface and the internal pores of the first layer 132 as well as the chemical affinity between the material included in the first layer 132 and the solvent. Hence, when the material is the same, the reduction rate mainly depends on the structures of the surface and the internal pores. In the case where a great number of large pores is included in the first layer 132, an ability to retain the electrolyte solution 140 is increased, leading to a decrease in the reduction rate of a droplet. In this case, although the affinity to the electrolyte solution 140 is high, this high affinity limits transportation of the electrolyte solution 140. In contrast, in the case where the size of the pores is small or their number is small, a high reduction rate of a droplet is observed due to the low ability to retain the electrolyte solution 140. In this case, although the affinity to the electrolyte solution 140 is high, the transportation of the electrolyte solution 140 is hardly inhibited. The first layer 132 is configured so that the reduction rate of a droplet falls within the aforementioned range, which leads to a suitable balance between the abilities of the first layer 132 to retain the electrolyte solution 140 and to transmit the electrolyte solution 140 therethrough.

The spot diameter corresponds to the spread of the solvent at the surface of the first layer 132 and mainly depends on the affinity to the solvent at the surface of the first layer 132. An increase in spot diameter implies an enhanced affinity, which means that an ability of the first layer 132 to retain the electrolyte solution 140 is high, while the transportation of the electrolyte solution 140 is restricted. On the other hand, in the case where the spot diameter is small, it is possible to secure a high transportation rate of the electrolyte solution 140 in the first layer 132 although the affinity of the first layer 132 to the solvent is low and the ability to retain the electrolyte solution 140 is low. Therefore, the first layer 132 is configured so that the spot diameter falls within the aforementioned range, which leads to a suitable balance between the abilities of the first layer 132 to retain the electrolyte solution 140 and to transmit the electrolyte solution 140 therethrough.

The WI is an index indicating hue (whiteness), and a high WI means a high whiteness. A decrease in WI (i.e., low whiteness) suggests an increase in number of functional groups such as a carboxyl group at the surface or in the first layer 132. Thus, permeation of the electrolyte solution 140 is inhibited by the polar functional groups such as a carboxyl group. On the other hand, a high WI suggests a small number of polar functional groups. A polar functional group contributes to the affinity of the first layer 132 to the electrolyte solution 140 since the solvent in the electrolyte solution 140 is relatively highly polar. Thus, although permeation of the electrolyte solution is promoted with increasing WI, the contribution of the polar functional groups to an increase in affinity is decreased and the ability to retain the electrolyte solution 140 is diminished. Hence, the first layer 132 is configured so that the WI falls within the aforementioned range, which leads to a suitable balance between the abilities of the first layer 132 to retain the electrolyte solution 140 and to transmit the electrolyte solution 140 therethrough.

2. Electrode

As described above, the positive electrode 110 may include the positive-electrode current collector 112 and the positive-electrode active-substance layer 114. Similarly, the negative electrode 120 may include the negative-electrode current collector 122 and the negative-electrode active-substance layer 124 (see FIG. 1A). The positive-electrode current collector 112 and the negative-electrode current collector 122 respectively possess the positive-electrode active-substance layer 114 and the negative-electrode active-substance layer 124 and have functions to supply current to the positive-electrode active-substance layer 114 and the negative-electrode active-substance layer 124, respectively.

A metal such as nickel, copper, titanium, tantalum, zinc, iron, and cobalt or an alloy such as stainless steel including these metals can be used for the positive-electrode current collector 112 and the negative-electrode current collector 122, for example. The positive-electrode current collector 112 and the negative-electrode current collector 122 may have a structure in which a plurality of layers including these metals or alloys is stacked.

The positive-electrode active-substance layer 114 and the negative-electrode active-substance layer 124 respectively include a positive-electrode active substance and a negative-electrode active substance. The positive-electrode active substance and the negative-electrode active substance have a role to release and absorb carrier ions such as lithium ions.

As a positive-electrode active substance, a material capable of being doped or de-doped with carrier ions is represented, for example. Specifically, a lithium-based composite oxide containing at least one kind of transition metals such as vanadium, manganese, iron, cobalt, and nickel is represented. As such a composite oxide, a lithium-based composite oxide having an $\alpha$-NaFeO$_2$-type structure, such as lithium nickelate and lithium cobalate, and a lithium-based composite oxide having a spinel-type structure, such as lithium manganese spinel, are given. These composite oxides have a high average discharge potential.

The lithium-based composite oxide may contain another metal element and is exemplified by lithium nickelate (composite lithium nickelate) including an element selected from titanium, zirconium, cerium, yttrium, vanadium, chromium, manganese, iron, cobalt, copper, silver, magnesium, aluminum, gallium, indium, tin, and the like, for example. These metals may be adjusted to be equal to or more than 0.1 mol % and equal to or less than 20 mol % to the metal elements in the composite lithium nickelate. This structure provides the secondary battery 100 with an excellent rate-maintaining ability when used at a high capacity.

Similar to the positive-electrode active substance, a material capable of being doped and de-doped with carrier ions can be used as the negative-electrode active substance. For example, a lithium metal or a lithium alloy is represented. Alternatively, it is possible to use a carbon-based material such as graphite exemplified by natural graphite and artificial graphite, cokes, carbon black, and a sintered polymeric compound exemplified by carbon fiber; a chalcogen-based compound capable of being doped and de-doped with lithium ions at a potential lower than that of the positive electrode, such as an oxide and a sulfide; an element capable of being alloyed or reacting with an alkaline metal, such as aluminum, lead, tin, bismuth, and silicon; an intermetallic compound of cubic system (AlSb, Mg$_2$Si, NiSi$_2$) undergoing alkaline-metal insertion between lattices; lithium-nitride compound (Li$_{3-x}$M$_x$N (M: transition metal)); and the like. Among the negative-electrode active substances, the carbon-based material including graphite such as natural graphite and artificial graphite as a main component provides a large energy density due to high potential uniformity and a low average discharge potential. For example, it is possible to use, as the negative-electrode active substance, a mixture of graphite and silicon with a ratio of silicon to carbon equal to or larger than 5 mol % and equal to or smaller 10 mol %.

The positive-electrode active-substance layer 114 and the negative-electrode active-substance layer 124 may each further include a conductive additive and binder other than the aforementioned positive-electrode active substance and the negative-electrode active substance.

As a conductive additive, a carbon-based material is represented. Specifically, graphite such as natural graphite and artificial graphite, cokes, carbon black, pyrolytic carbons, and a sintered polymeric compound such as carbon fiber are given. A plurality of materials described above may be mixed to use as a conductive additive.

As a binder, poly(vinylidene fluoride) (PVDF), polytetrafluoroethylene, poly(vinylidene fluoride-co-hexafluoropropylene), poly(tetrafluoroethylene-co-hexafluoropropylene), poly(tetrafluoroethylene-co-perfluoroalkyl vinyl ether), poly(ethylene-co-tetrafluoroethylene), a copolymer in which vinylidene fluoride is used as a monomer, such as a poly(vinylidene fluoride-co-hexafluoropropylene-co-tetrafluoroethylene), a thermoplastic resin such as a thermoplastic polyimide, polyethylene, and polypropylene, an acrylic resin, styrene-butadiene rubber, and the like are represented. Note that a binder may further have a function as a thickener.

The positive electrode 110 may be formed by applying a mixture of the positive-electrode active substance, the conductive additive, and the binder on the positive-electrode current collector 112, for example. In this case, a solvent may be used to form or apply the mixture. Alternatively, the positive electrode 110 may be formed by applying a pressure to the mixture of the positive-electrode active substance, the conductive additive, and the binder to process the mixture and arranging the processed mixture on the positive electrode 110. The negative electrode 120 can also be formed with a similar method.

3. Electrolyte Solution

The electrolyte solution 140 includes the solvent and an electrolyte, and at least a part of the electrolyte is dissolved in the solvent and electrically dissociated. As the solvent, water and an organic solvent can be used. In the case where the secondary battery 100 is utilized as a nonaqueous electrolyte-solution secondary battery, an organic solvent is used. As an organic solvent, carbonates such as ethylene carbonate, propylene carbonate, dimethyl carbonate, diethyl carbonate, ethyl methyl carbonate, and 1,2-di(methoxycarbonyloxy)ethane, ethers such as 1,2-dimethoxyethane, 1,3-dimethoxypropane, tetrahydrofuran, and 2-methyltetrahydrofuran; esters such as methyl formate, methyl acetate, and $\gamma$-butyrolactone; nitriles such as acetonitrile and butyronitrile; amides such as N,N-dimethylformamide and N,N-dimethylacetamide; carbamates such as 3-methyl-2-oxazolidone, sulfur-containing compounds such as sulfolane, dimethyl sulfoxide, and 1,3-propanesultone, a fluorine-containing organic solvent in which fluorine is introduced to the aforementioned organic solvent; and the like are represented. A mixed solvent of these organic solvents may also be employed.

As a typical electrolyte, a lithium salt is represented. For example, LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, a lithium salt of a carboxylic acid having 2 to 6 carbon atoms, LiAlCl$_4$, and the like are represented. Just one kind of the lithium salts mentioned above may be used, and more than two kinds of lithium salts may be combined.

Note that, in a broad sense, an electrolyte may mean a solution of an electrolyte. However, in the present specification and claims, a narrow sense is employed. That is, an electrolyte is a solid and is electrically dissociated upon dissolving in a solvent to provide an ion conductivity to the resulting solution.

4. Fabrication Process of Secondary Battery

As shown in FIG. 1A, the negative electrode 120, the separator 130, and the positive electrode 110 are arranged to form a stacked body. After that, the stacked body is disposed in a housing which is not illustrated. The secondary battery 100 can be fabricated by filling the housing with the electrolyte solution and sealing the housing while reducing a pressure in the housing or by sealing the housing after filing the housing with the electrolyte solution while reducing a pressure in the housing. A shape of the secondary battery 100 is not limited and may be a thin-plate (paper) form, a disc form, a cylinder form, a prism form such as a rectangular parallelepiped, or the like.

Second Embodiment

In the present embodiment, a method for preparing the first layer 132 described in the First Embodiment is described. An explanation of the structures the same as those of the First Embodiment may be omitted.

A method for preparing the first layer 132 includes (1) a process for obtaining a polyolefin-resin composite by kneading an ultrahigh-molecular weight polyethylene, a low-molecular weight hydrocarbon, and a pore-forming agent, (2) a process for forming a sheet by rolling the polyolefin-resin composite with a rolling roll (rolling process), (3) a process for removing the pore-forming agent from the sheet obtained in the process (2), (4) a process for processing into a film state by stretching the sheet obtained in the process (3), and (5) a process for performing a thermal fixation on the stretched sheet. The order of the process (3) and the process (4) may be interchanged.

1. Process (1)

A shape of the ultrahigh-molecular weight polyolefin is not limited, and a polyolefin processed into a powder state may be used. As the low-molecular weight hydrocarbon, a low-molecular weight polyolefin such as polyolefin wax and a low-molecular weight polymethylene such as Fisher-Tropsh wax are represented. A weight-average molecular weights of the low-molecular weight polyolefin and the low-molecular weight polymethylene are equal to or higher than 200 and equal to or lower than 3000, for example, by which the low-molecular weight hydrocarbon can be prevented from being volatilized and can be homogeneously mixed with the ultrahigh-molecular weight polyolefin. Note that a polymethylene is defined as a kind of polyolefin in the present specification and claims.

As the pore-forming agent, an organic filling agent and an in organic filling agent are represented. As an organic filling agent, a plasticizer may be used, for example, and a low-molecular weight hydrocarbon such as a liquid paraffin is represented.

As the inorganic filling agent, an inorganic material soluble in a neutral, acidic, or alkaline solvent is represented, and calcium carbonate, magnesium carbonate, barium carbonate, and the like are exemplified. Other than these materials, an inorganic compound such as calcium chloride, sodium chloride, and magnesium sulfate is represented.

One kind of pore-forming agent may be used, or two kinds of pore-forming agent may be used. As a typical pore-forming agent, calcium carbonate is represented.

At this time, the use of a pore-forming agent having a BET (Brunauer-Emmtett-Teller) specific surface area equal to or larger than 6 m$^2$/g and equal to or smaller than 16 m$^2$/g, equal to or larger than 8 m$^2$/g and equal to or smaller than 15 m$^2$/g, or equal to or larger than 10 m$^2$/g and equal to or smaller than 13 m$^2$/g increases dispersibility of the pore-forming agent and prevents local oxidation of the first layer 132 when processing. Thus, formation of a functional group such as a carboxylic group in the first layer 132 is prevented, and pores having a small average pore diameter can be uniformly distributed. As a result, the first layer 132 with the WI equal to or more than 85 and equal to or less than 98 can be obtained.

With respect to a weight ratio of the materials, the low-molecular weight hydrocarbon of equal to or more than 5 weight portions and equal to or less than 200 weight portions and the pore-forming agent of equal to or more than 100 weight portions and equal to or less than 400 weight portions may be used with respect to the ultrahigh-molecular weight polyethylene of 100 weight portions. At this time, an organic additive may be added. An amount of the organic additive may be 1 weight portion or more and 10 weight portions or less, 2 weight portions or more and 7 weight portions or less, or 3 weight portions or more and 15 weight portions or less with respect to the ultrahigh-molecular weight polyethylene of 100 weight portions.

2. Process (2)

The process (2) may be performed by processing the polyolefin-resin composite into a sheet state using a T-die processing method at a temperature equal to or higher than 245° C. and equal to or lower than 280° C. or equal to or higher than 245° C. and equal to or lower than 260° C. An inflation processing method may be employed instead of the T-die processing method.

3. Process (3)

In the process (3), a solution of water or organic solvent to which an acid or a base is added, or the like is used as a cleaning solution. A surfactant may be added to the cleaning solution. An addition amount of the surfactant can be arbitrarily selected from a range equal to or more than 0.1 wt % and equal to or less than 15 wt % or equal to or more than 0.1 wt % and equal to or less than 10 wt %. It is possible to secure a high cleaning efficiency and prevent the surfactant from being left by selecting the addition amount from this range. A cleaning temperature may be selected from a temperature range equal to or higher than 25° C. and equal to or lower than 60° C., equal to or higher than 30° C. and equal to or lower than 55° C., or equal to or higher than 35° C. and equal to or lower than 50° C., by which a high cleaning efficiency can be obtained and evaporation of the cleaning solution can be avoided.

In the process (3), water cleaning may be further conducted after removing the pore-forming agent with the cleaning solution. The temperature in the water cleaning may be selected from a temperature range equal to or higher than 25° C. and equal to or lower than 60° C., equal to or higher than 30° C. and equal to or lower than 55° C., or equal to or higher than 35° C. and equal to or lower than 50° C. The first layer 132 without the pore-forming agent can be obtained by the process (3).

4. Process (5)

In view of molecular motion of the polyolefin molecules to be used, a temperature of the thermal fixation in the process (5) can be selected from a range equal to or higher than (Tm—30° C.) and lower than Tm, equal to or higher than (Tm—20° C.) and lower than Tm, or equal to or higher than (Tm—10° C.) and lower than Tm where Tm is a melting point of the ultrahigh-molecular weight polyolefin. Selection from these temperature ranges prevents the polyolefin from melting and the pores from closing.

Through the above processes, the first layer 132 having a controlled size and shape of the internal pores can be obtained. As a result, it is possible to prepare the first layer 132 which satisfies the property ranges described in the First Embodiment and which has a suitable electrolyte-solution permeability and a retaining ability as well as the separator 130 including the first layer 132.

Third Embodiment

In the present embodiment, an embodiment in which the separator 130 has the porous layer 134 in addition to the first layer 132 is explained.

1. Structure

As described in the First Embodiment, the porous layer 134 may be disposed on one side or both sides of the first layer 132 (see FIG. 1B). When the porous layer 134 is stacked on one side of the first layer 132, the porous layer 134 may be arranged on a side of the positive electrode 110 or on a side of the negative electrode 120 of the first layer 132.

The porous layer 134 is insoluble in the electrolyte solution 140 and is preferred to include a material chemically stable in a usage range of the second battery 100. As such a material, it is possible to represent a polyolefin such as polyethylene, polypropylene, polybutene, poly(ethylene-co-propylene); a fluorine-containing polymer such as poly(vinylidene fluoride) and polytetrafluoroethylene; a fluorine-containing polymer such as poly(vinylidene fluoride-co-hexafluoropropylene), poly(vinylidene fluoride-co-hexafluoropropylene-co-tetrafluoroethylene), and poly(ethylene-co-tetrafluoroethylene), an aromatic polyamide (aramide); rubber such as poly(styrene-co-butadiene) and a hydride thereof, a copolymer of methacrylic esters, a poly(acrylonitrile-co-acrylic ester), a poly(styrene-co-acrylic ester), ethylene-propylene rubber, and poly(vinyl acetate); a polymer having a melting point and a glass-transition temperature of 180° C. or more, such as poly(phenylene ether), a polysulfone, a poly(ether sulfone), polyphenylenesulfide, a poly(ether imide), a polyamide-imide, a polyether-amide, and a polyester; a water-soluble polymer such as poly(vinyl alcohol), poly(ethylene glycol), a cellulose ether, sodium alginate, poly(acrylic acid), polyacrylamide, poly(methacrylic acid); and the like.

As an aromatic polyamide, poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylenecarboxylic amide), poly(metaphenylene-4,4'-biphenylenecarboxilic amide), poly(paraphenyelnee-2,6-natphthalenedicarboxlic amide), poly(metaphenyelnee-2,6-natphthalenedicarboxlic amide), poly(2-chloroparaphenylene terephthalamide), a copolymer of paraphenylene terephthalamide with 2,6-dichloroparaphenylene terephthalamide, a copolymer of metaphenylene terephthalamide with 2,6-dichloroparaphenylene terephthalamide, and the like are represented, for example.

The porous layer 134 may include a filler. A filler consisting of an organic substance or an inorganic substance is represented as a filler. A filler called a filling agent and consisting of an inorganic substance is preferred. A filler consisting of an inorganic oxide such as silica, calcium oxide, magnesium oxide, titanium oxide, alumina, mica, zeolite, aluminum hydroxide, boehmite, and the like is more preferred, at least one kind of filler selected from a group consisting of silica, magnesium oxide, titanium oxide, aluminum hydroxide, boehmite, and alumina is further preferred, and alumina is especially preferred. Alumina has a number of crystal forms such as α-alumina, β-alumina, γ-alumina, θ-alumina, and the like, and any of the crystal forms can be appropriately used. Among them, α-alumina is most preferable due to its particularly high thermal stability and chemical stability. Just one kind of filler may be used, or two or more kinds of filler may be combined in the porous layer 134.

No limitation is provided to a shape of the filler, and the filler may have a sphere shape, a cylindrical shape, an elliptical shape, a gourd shape, and the like. Alternatively, a filler in which these shapes are mixed may be used.

When the porous layer 134 includes the filler, an amount of the filler to be included may be equal to or larger than 1 vol % and equal to or smaller than 99 vol % or equal to or larger than 5 vol % and equal to or smaller than 95 vol % with respect to the porous layer 134. The aforementioned range of the amount of the filler to be included prevents the space formed by contact between the fillers from being closed by the material of the porous layer 134, which leads to sufficient ion permeability and allows its weight per unit area to be adjusted.

A thickness of the porous layer 134 can be selected from a range equal to or larger than 0.5 μm and equal to or smaller than 15 μm or equal to or larger than 2 μm and equal to or smaller than 10 μm. Hence, when the porous layers 134 are formed on both sides of the first layer 132, a total thickness of the porous layers 134 may be selected from a range equal to or larger than 1.0 μm and equal to or smaller than 30 μm or equal to or larger than 4 μm and equal to or smaller than 20 μm.

When the total thickness of the porous layers 134 is arranged to be equal to or larger than 1.0 μm, internal short-circuits caused by damage to the secondary battery 100 can be more effectively prevented. The total thickness of the porous layers 134 equal to or smaller than 30 μm prevents an increase in permeation resistance of the carrier ions, thereby preventing deterioration of the positive electrode 110 and a decrease in rate performance resulting from an increase in permeation resistance of the carrier ions. Moreover, it is possible to avoid an increase in distance between the positive electrode 110 and the negative electrode 120, which contributes to miniaturization of the secondary battery 100.

The weight per unit area of the porous layer 134 may be selected from a range equal to or more than 1 g/m$^2$ and equal to or less than 20 g/m$^2$ or equal to or more than 2 g/m$^2$ and equal to or less than 10 g/m$^2$. This range increases an energy density per weight and energy density per volume of the secondary battery 100.

A porosity of the porous layer 134 may be equal to or more than 20 vol % and equal to or less than 90 vol % or equal to or more than 30 vol % and equal to or less than 80 vol %. This range allows the porous layer 134 to have sufficient ion permeability. An average porous diameter of the pores included in the porous layer 134 may be selected from a range equal to or larger than 0.01 μm and equal to or smaller than 1 μm or equal to or larger than 0.01 μm and equal to or smaller than 0.5 μm, by which a sufficient ion permeability is provided to the secondary battery 100 and the shutdown function can be improved.

A gas permeability of the separator 130 including the aforementioned first layer 132 and the porous layer 134 may be equal to or higher than 30 s/100 mL and equal to or lower than 1000 s/100 mL or equal to or higher than 50 s/100 mL and equal to or lower than 800 s/100 L in a Gurley value, which enables the separator 130 to have sufficient strength, maintain a high shape stability at a high temperature, and possess sufficient ion permeability.

2. Preparation Method

When the porous layer 134 including the filler is prepared, the aforementioned polymer or resin is dissolved or dispersed in a solvent, and then the filler is dispersed in this mixed liquid to form a dispersion (hereinafter, referred to as a coating liquid). As a solvent, water; an alcohol such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, N,N-dimethylformamide; and the like are represented. Just one kind of solvent may be used, or two or more kinds of solvents may be used.

When the coating liquid is prepared by dispersing the filler to the mixed liquid, a mechanical stirring method, an ultrasonic dispersing method, a high-pressure dispersion method, a media dispersion method, and the like may be applied. In addition, after the filler is dispersed in the mixed liquid, the filler may be subjected to wet milling by using a wet-milling apparatus.

An additive such as a dispersant, a plasticizer, a surfactant, or a pH-adjusting agent may be added to the coating liquid.

After the preparation of the coating liquid, the coating liquid is applied on the first layer 132. For example, the porous layer 134 can be formed over the first layer 132 by directly coating the first layer 132 with the coating liquid by using a dip-coating method, a spin-coating method, a printing method, a spraying method, or the like and then removing the solvent. Instead of directly applying the coating liquid over the first layer 132, the porous layer 134 may be transferred onto the first layer 132 after being formed on another supporting member. As a supporting member, a film made of a resin, a belt or drum made of a metal may be used.

Any method selected from natural drying, fan drying, heat drying, and vacuum drying may be used to remove the solvent. Drying may be conducted after substituting the solvent with another solvent (e.g., a solvent with a low boiling point). When heating, drying may be carried out at 10° C. or higher and 120° C. or lower or at 20° C. or higher and 80° C. or lower. This temperature range avoids a reduction in gas permeability caused by shrinkage of the pores in the first layer 132.

A thickness of the porous layer 134 can be controlled by a thickness of the coating film in a wet state after coating, an amount of the filler included, a concentration of the polymer and the resin, and the like.

EXAMPLE

1. Preparation of Separator

An example for preparing the separator 130 is described below.

1-1. Example 1

After mixing 70 wt % of ultrahigh-molecular weight polyethylene powder (GUR4032 manufactured by Ticona) and 30 wt % of polyethylene wax (FNP-0115, manufactured by Nippon Seiro Co. Ltd.) having a weight-average molecular weight of 1000, 0.4 weight portions of an antioxidant (Irg1010, manufactured by CIBA Specialty Chemicals), 0.1 weight portions of an antioxidant (P168 manufactured by CIBA Speciality Chemicals®), and 1.3 weight portions of sodium stearate with respect to 100 weight portions of the summation of the ultrahigh-molecular weight polyethylene and the polyethylene wax were added. Calcium carbonate (manufactured by Maruo Calcium Co. LTD.) with an average particle diameter of 0.1 μm and a BET specific surface area of 11.6 m$^2$/g was further added so that its proportion to the entire volume is 36 vol %, and these materials were mixed in a powder state in a Henschel mixer to obtain a mixture 1. After that, the mixture 1 was kneaded while melting in a twin-screw kneader to obtain a polyolefin-resin composite 1. The polyolefin-resin composite 1 was extruded from a T-die set at 250° C. so as to have a sheet form, and this sheet was rolled with a pair of rollers at a surface temperature of 150° C. to result in a rolled sheet 1. Next, the rolled sheet 1 was dipped in hydrochloric acid (4 mol/L) including 0.5 wt % of a nonionic surfactant to remove calcium carbonate from the rolled sheet 1, sequentially stretched to 7.0 times, and further subjected to thermal fixation at 123° C. to obtain the separator 130.

1-2. Example 2

The separator 130 was obtained with the same method as the Example 1 except that the calcium carbonate was switched to calcium carbonate (manufactured by Maruo Calcium Co. LTD.) with an average particle diameter of 0.1 μm and a BET specific surface area of 11.6 m$^2$/g and that the thermal fixation was carried out at 110° C.

1-3. Example 3

The separator 130 was obtained with the same method as the Example 1 except that the calcium carbonate was switched to calcium carbonate (manufactured by Maruo Calcium Co. LTD.) with an average particle diameter of 0.1 μm and a BET specific surface area of 11.8 m$^2$/g and that the rolled sheet was stretched to 6.2 times.

An example for preparing separators used as Comparative Examples is described below.

1-4. Comparative Example 1

After mixing 68 wt % of ultrahigh-molecular weight polyethylene powder (GUR2024 manufactured by Ticona) and 32 wt % of polyethylene wax (FNP-0115 manufactured by Nippon Seiro Co. Ltd.) having a weight-average molecular weight of 1000, 0.4 weight portions of an antioxidant (Irg1010 manufactured by CIBA Speciality Chemicals), 0.1 weight portions of an antioxidant (P168 manufactured by CIBA Speciality Chemicals), and 1.3 weight portions of sodium stearate with respect to 100 weight portions of the summation of the ultrahigh-molecular weight polyethylene and the polyethylene wax were added. Calcium carbonate (manufactured by Maruo Calcium Co. LTD.) with an average particle diameter of 0.1 μm and a BET specific surface area of 11.6 m$^2$/g was further added so that its proportion to the entire volume is 38 vol %, and these materials were mixed in a powder state in a Henschel mixer to obtain a mixture 2. After that, the mixture 2 was kneaded while melting in a twin-screw kneader to obtain a polyolefin-resin composite 2. The polyolefin-resin composite 2 was extruded from a T-die set at 240° C. so as to have a sheet form, and this sheet was rolled with a pair of rollers having a surface temperature of 150° C. to result in a rolled sheet 2. After that, the rolled sheet 2 was dipped in hydrochloric acid (4 mol/L) including 0.5 wt % of a nonionic surfactant to remove calcium carbonate from the rolled sheet 2, sequentially stretched to 6.2 times, and further subjected to thermal fixation at 126° C. to obtain the separator.

1-5. Comparative Example 2

A commercially available polyolefin porous film (#2400 manufactured by Celgard, LLC.) was used as a comparative separator.

2. Fabrication of Secondary Battery

A method for fabricating the secondary batteries including the separators of the Examples 1 to 3 and Comparative Examples 1 and 2 is described below.

2-1. Positive Electrode

A commercially available positive electrode manufactured by applying a stack of $LiNi_{0.5}Mn_{0.3}Co_{0.2}O_2$/conductive material/PVDF (weight ratio of 92/5/3) on an aluminum foil was processed. Here, $LiNi_{0.5}Mn_{0.3}Co_{0.2}O_2$ is an active-substance layer. Specifically, the aluminum foil was cut so that a size of the positive-electrode active-substance layer is 45 mm×30 mm and that a portion with a width of 13 mm, in which the positive-electrode active-substance layer is not formed, was left in a periphery and was used as a positive electrode in the following fabrication process. A thickness, a density, and a positive-electrode capacity of the positive-electrode active-substance layer were 58 μm, 2.50 g/cm$^3$, and 174 mAh/g, respectively.

2-2. Negative Electrode

A commercially available negative electrode manufactured by applying graphite/poly(styrene-co-1,3-butadiene)/carboxymethyl cellulose sodium salt (weight ratio of 98/1/1) on a copper foil was used. Here, the graphite functions as a negative-electrode active-substance layer. Specifically, the copper foil was cut so that a size of the negative-electrode active-substance layer is 50 mm×35 mm and that a portion with a width of 13 mm, in which the negative-electrode active-substance layer is not formed, was left in a periphery and was used as a negative electrode in the following fabrication process. A thickness, a density, and a negative-electrode capacity of the negative-electrode active-substance layer were 49 μm, 1.40 g/cm$^3$, and 372 mAh/g, respectively.

2-3. Fabrication

The positive electrode, the separator, and the negative electrode were stacked in the order in a laminated pouch to obtain a stacked body. At this time, the positive electrode and the negative electrode were arranged so that the entire top surface of the positive-electrode active-substance layer overlaps with a main surface of the negative-electrode active-substance layer.

Next, the stacked body was arranged in an envelope-shaped housing formed by stacking an aluminum layer and a heat-seal layer, and 0.25 mL of an electrolyte solution was added into the housing. A mixed solution in which $LiPF_6$ was dissolved at 1.0 mol/L in a mixed solvent of ethyl methyl carbonate, diethyl carbonate, and ethylene carbonate with a volume ratio of 50:20:30 was used as the electrolyte solution. The secondary battery was fabricated by heat-sealing the housing while reducing the pressure in the housing. A designed capacity of the secondary battery was 20.5 mAh.

3. Evaluation

The methods for evaluating a variety of physical properties of the separators according to the Examples 1 to 3 and the Comparative Examples 1 and 2 and the performance of the secondary batteries including the separators are described below.

3-1. Thickness

The thicknesses were measured using a High-Resolution Digital Measuring Unit manufactured by Mitsutoyo Corporation.

3-2. Reduction Rate of Droplet

The reduction rates of the droplets on the separators prepared in the Examples 1 to 3 and the Comparative Examples 1 and 2 were measured by the following method. The separator of 50 mm×50 mm was placed on a polytetrafluoroethylene (PTFE) plate. Onto a center portion of the separator was dropped 20 μL of diethyl carbonate from a position at a height of 5 mm using a micropipet (article name: Reference for 20 μL manufactured by Eppendorf Corporate) equipped with a pipet tip (article name: Standard of a yellow chip for 0.5 to 20 μL manufactured by Eppendorf Corporate). A weight change after dropping was monitored with an analytical balance (model AUW220 manufactured by Shimadzu Corporation) to measure an evaporation time until the weight of diethyl carbonated changes from 15 mg to 5 mg. The reduction rate was calculated by dividing the variation in weight of diethyl carbonate (10 mg) by the evaporation time. The conditions at the time of measurement were as follows: an atmospheric pressure, room temperature (c.a., 25° C.), humidity equal to or higher than 60% and equal to or lower than 70%, and a wind speed equal to or lower than 0.2 m/s.

3-3. Spot Diameter of Droplet

The spot diameters of the droplets on the separators prepared in the Example 1 to 3 and the Comparative Examples 1 and 2 were measured by the following method. Similar to the measurement of the reduction rate of the droplet, 20 μL of diethyl carbonate was added onto the center portion of the separator from a position at a height of 5 mm to form a spot of the droplet. The diameter of the droplet was measured 10 seconds after the formation of the spot.

3-4. WI

The WIs of the separators were measured with a SCI (Specular Component Include (including regular reflection light)) method using a spectrophotometer (CM-2002 manufactured by Minolta Co., LTD) in a state where the separator was arranged over a black paper (a thickest black-colored grain long fine paper with a size of 788 mm×1091 mm). An average of the measured values obtained at three or more positions was employed as a result.

3-5. Initial Battery Resistance

Alternating current with a 10 mV of voltage amplitude was applied to the secondary batteries fabricated by the aforementioned method at 25° C. using an LCR meter (chemical impedance meter model 3532-80 manufactured by HIOKI E.E. CORPORATION) to measure alternating-current impedances. An equivalent series resistance (Ω) at a frequency of 10 Hz was read from the measurement results and was employed as the initial battery resistance of the nonaqueous secondary battery.

3-6. Ability to Maintain Battery Performance

After that, the secondary batteries were subjected to charging/discharging for 100 cycles where a constant current in a voltage range from 4.2 V to 2.7 V was applied at 55° C. with one cycle set at a charging current of 1 C and a discharging current of 10 C. The nonaqueous electrolyte-solution secondary batteries subjected to the charging/discharging for 100 cycles were further subjected to charging/discharging at 55° C. for 3 cycles at a constant current until a charging current of 1 C and discharging currents of 0.2 C and 20 C. A ratio of discharging capacities at the discharging currents of 0.2 C and 20 C (20 C discharging capacity/0.2 C discharging capacity) in the third cycle was calculated as a rate property after the charging/discharging for 100 cycles. The same tests were carried out on the two secondary batteries fabricated by the aforementioned method, and an average of their rate properties after the charging/discharging for 100 cycles was obtained as the ability to maintain battery performance.

4. Property of Separator and Battery Performance

The properties of the separators of the Examples 1 to 3 and the Comparative Examples 1 and 2 and the performance of the secondary batteries fabricated using the separators are summarized in Table 1. As shown in Table 1, the separators of the Examples 1 to 3 each have the reduction rate of the droplet equal to or higher than 0.048 mg/s and equal to or lower than 0.067 mg/s and the WI equal to or more than 85 and equal to or less than 98. In addition, the separators of the Examples 1 to 3 each have the spot diameter equal to or larger than 20 mm and equal to or smaller than 30 and the WI equal to or more than 85 and equal to or less than 98. It was found that the secondary batteries fabricated using these separators exhibit a low initial battery resistance and maintain high battery performance after repeating the charging/discharging.

TABLE 1

Properties of Separators and Performance of Secondary Batteries

| | Reduction rate of droplet (mg/s) | Spot diameter (mm) | WI | Initial battery resistance [Ω] | Ability to maintain battery performance (%) |
|---|---|---|---|---|---|
| Example 1 | 0.066 | 23 | 94.16 | 0.79 | 48.9 |
| Example 2 | 0.049 | 21 | 97.04 | 0.76 | 42.9 |
| Example 3 | 0.056 | 21 | 91.36 | 0.79 | 47.7 |
| Comparative Example 1 | 0.083 | 20 | 87.34 | 0.91 | 36.9 |
| Comparative Example 2 | 0.046 | 17 | 83.68 | 1.03 | 18.1 |

In contrast, although the separator of the Comparative Example 1 has the spot diameter equal to or larger than 20 mm and equal to or smaller 30 mm and the WI equal to or more than 85 and equal to or less than 98, the reduction rate of the droplet does not fall within the range equal to or higher than 0.048 mg/s and equal to or lower than 0.067 mg/s.

The abilities to maintain the battery performance of the secondary batteries fabricated using the separators of the Comparative Examples 1 and 2 are each lower than those of the Examples 1 to 3. From these results, it was confirmed that a secondary battery exhibiting a low initial battery resistance and having a high ability to maintain battery performance can be obtained by using a separator which exhibits the reduction rate of diethyl carbonate dropped on the first layer 132 equal to or higher than 0.048 mg/s and equal to or lower than 0.067 mg/s and which has the WI equal to or more than 85 and equal to or less than 98.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements is included in the scope of the present invention as long as it possesses the concept of the present invention.

It is understood that another effect different from that provided by the modes of the aforementioned embodiments is achieved by the present invention if the effect is obvious from the description in the specification or readily conceived by persons ordinarily skilled in the art.

EXPLANATION OF REFERENCE NUMERAL

100: Secondary battery, 110: Positive electrode, 112: Positive-electrode current collector, 114: Positive-electrode active-substance layer, 120: Negative electrode, 122: Negative-electrode current collector, 124: Negative-electrode active-substance layer, 130: Separator, 132: First layer, 134: Porous layer, 140: Electrolyte solution

What is claimed is:

1. A separator comprising:
   a first layer consisting of a porous polyolefin, having a white index equal to or more than 85 and equal to or less than 98, and having a reduction rate of diethyl carbonate dropped on the first layer equal to or higher than 0.048 mg/s and equal to or lower than 0.067 mg/s, and
   a first porous layer over the first layer, the first porous layer consisting of a material selected from the group consisting of a polyolefin, a fluorine-containing polymer, rubber, and a water-soluble polymer,
   wherein the reduction rate is measured at atmospheric pressure, room temperature, humidity of 60 to 70%, and at a wind speed of 0.2 m/s or lower.

2. The separator according to claim 1,
   wherein a diameter of a spot of the diethyl carbonate formed by dropping diethyl carbonate on the first layer is equal to or larger than 20 mm and equal to or smaller than 30 mm 10 seconds after forming the spot.

3. The separator according to claim 1,
   wherein the white index is equal to or more than 90 and equal to or less than 98.

4. The separator according to claim 1, further comprising a second porous layer under the first layer, the second porous layer consisting of a material selected from the group consisting of a polyolefin, a fluorine-containing polymer, rubber, and a water-soluble polymer.

5. A secondary battery comprising the separator according to claim 1.

* * * * *